US012623559B2

(12) United States Patent
Ando

(10) Patent No.: US 12,623,559 B2
(45) Date of Patent: May 12, 2026

(54) SLIDING DOOR RESTRICTION TO PROTECT CHARGING CONNECTOR

(71) Applicant: TOYOTA JIDOSHA KABUSHIKI KAISHA, Toyota (JP)

(72) Inventor: Toru Ando, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 699 days.

(21) Appl. No.: 18/079,539

(22) Filed: Dec. 12, 2022

(65) Prior Publication Data

US 2023/0241989 A1     Aug. 3, 2023

(30) Foreign Application Priority Data

Jan. 31, 2022     (JP) ................................. 2022-012855

(51) Int. Cl.
B60L 53/16          (2019.01)

(52) U.S. Cl.
CPC ........... B60L 53/16 (2019.02); B60L 2270/32 (2013.01)

(58) Field of Classification Search
CPC ............................ B60L 53/16; B60L 2270/32

USPC ......................................................... 320/107
See application file for complete search history.

(56) References Cited

U.S. PATENT DOCUMENTS 7,950,943 B2 *   5/2011   Ohtomo .................. B60L 53/16
                                                                      439/299
2009/0082916 A1 *   3/2009   Tanaka .................... B60L 53/60
                                                                      70/237

FOREIGN PATENT DOCUMENTS

GB          2599152     *   3/2022
JP      2009-081917 A       4/2009
JP          4379823 B2      4/2009
JP      2017-154580 A       9/2017
KR      20220002784   *   1/2022

* cited by examiner

*Primary Examiner* — Richard V Muralidar
(74) *Attorney, Agent, or Firm* — Dinsmore & Shohl LLP

(57)          ABSTRACT
A vehicle includes a sliding door, an energy storage device for storing energy used to generate driving force for the vehicle, an energy supply port located in a range in which the sliding door is movable, the energy supply port being configured to receive energy provided from an external energy supply source and supply energy to the energy storage device, and a control device that restricts movement of the sliding door when an energy supply connector is connected to the energy supply port.

5 Claims, 8 Drawing Sheets

FIG. 2

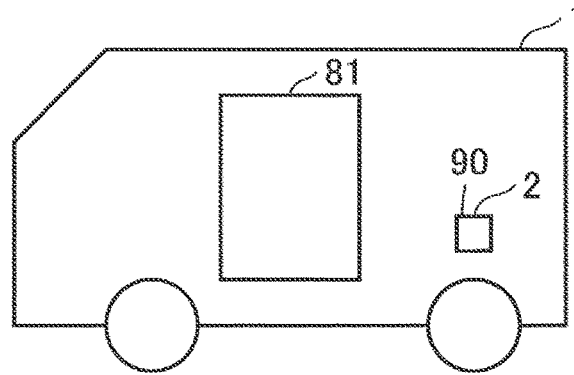

FIG. 3

```
           ┌─────────────┐
           │    START    │
           └─────────────┘
                  │
                  ▼              S101
      ┌──────────────────────────┐
      │      OPERATION TO        │
      │   OPEN SLIDING DOOR      │
      └──────────────────────────┘
                  │
                  ▼              S102
              ╱         ╲           NO
            ╱   CHARGING   ╲──────────────┐
            ╲ LID CLOSED?  ╱              │
              ╲         ╱                 │
                  │ YES                   │
                  ▼              S103     │
              ╱         ╲          YES    │
            ╱  CHARGING   ╲───────────────┤
            ╲  CONNECTOR  ╱               │
            ╲ CONNECTED? ╱                │
              ╲         ╱                 │
                  │ NO                    │
                  ▼         S104          ▼                    S105
      ┌──────────────────────────┐  ┌──────────────────────────┐
      │ FULLY OPEN SLIDING DOOR  │  │   MAINTAIN FULLY-CLOSED   │
      │                          │  │   STATE OF SLIDING DOOR   │
      └──────────────────────────┘  └──────────────────────────┘
                  │◄─────────────────────────┘
                  ▼
           ┌─────────────┐
           │     END     │
           └─────────────┘
```

SLIDING DOOR RESTRICTION TO PROTECT CHARGING CONNECTOR

CROSS-REFERENCE TO RELATED APPLICATION

This application claims priority to Japanese Patent Application No. 2022-012855 filed on Jan. 31, 2022, incorporated herein by reference in its entirety.

BACKGROUND

1. Technical Field

The present disclosure relates to a vehicle.

2. Description of Related Art

There have been known vehicles that are capable of suppressing situations from occurring such as theft of a charging cable used for charging, vandalism of a vehicle-side electric outlet by insertion of foreign matter, and so forth.

In a vehicle described in Japanese Unexamined Patent Application Publication No. 2009-81917 (JP 2009-81917 A), an operation is performed of switching a charging lock mechanism from an unlocked state to a locked state when occupants leave the vehicle, based on a command to switch a door lock mechanism from an unlocked state to a locked state.

SUMMARY

When a sliding door is opened while a charging port of an electrified vehicle is opened and a charging cable is connected to the charging port to charge the electrified vehicle, the sliding door and the charging cable may come into contact with each other. JP 2009-81917 A does not take into consideration any measures to take, with regard to such problems.

Such problems are not limited to electrified vehicles, and also occur in vehicles that generate driving force using gasoline, or other energy such as hydrogen. Such vehicles also have a risk of contact between a sliding door and an energy supply connector connected to an energy supply port.

Accordingly, the present disclosure provides an electrified vehicle that is capable of avoiding contact between the sliding door and the energy supply connector during charging.

A vehicle according to an aspect of the present disclosure includes a sliding door, an energy storage device configured to store energy used to generate driving force for the vehicle, an energy supply port located in a range of movement of the sliding door, the energy support being configured to receive the energy provided from an external energy supply source and supply the energy to the energy storage device, and a control device configured to restrict the movement of the sliding door when an energy supply connector is connected to the energy supply port.

According to this configuration, when the energy supply connector is connected to the energy supply port, movement of the sliding door is restricted, so the sliding door and the energy supply connector can be avoided from coming into contact.

In the vehicle according to the above aspect, the control device may prohibit the movement of the sliding door when the energy supply connector is connected to the energy supply port.

According to this configuration, when the energy supply connector is connected to the energy supply port, the movement of the sliding door is prohibited, so the sliding door and the energy supply connector can be avoided from coming into contact.

In the vehicle according to the above aspect, the control device may restrict a range in which the sliding door is moveable when the energy supply connector is connected to the energy supply port.

According to this configuration, when the energy supply connector is connected to the energy supply port, the movable range of the sliding door is restricted, so the sliding door and the energy supply connector can be avoided from coming into contact.

In the vehicle according to the above aspect, the external energy supply source may be an external electric power supply, the energy storage device may be an electric power storage device, the energy supply port may be a charging port, and the energy supply connector may be a charging connector of a charging cable.

According to this configuration, the sliding door and the charging connector of the charging cable can be avoided from coming into contact during charging.

According to the present disclosure, the sliding door and the energy supply port can be avoided from coming into contact during charging.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a diagram illustrating a sliding door 81, a charging lid 2, and a vehicle inlet 90;

FIG. 3 is a flowchart showing control procedures for the sliding door 81 according to the first embodiment;

DETAILED DESCRIPTION OF EMBODIMENTS

Embodiments of the present disclosure will be described below in detail with reference to the drawings. Note that the same or corresponding parts are denoted by the same signs throughout the drawings, and description thereof will not be repeated.

First Embodiment

The present embodiment will be described below in detail with reference to the drawings. Note that the same or corresponding parts are denoted by the same signs through-out the drawings, and description thereof will not be repeated.

First Embodiment

Figure 1:
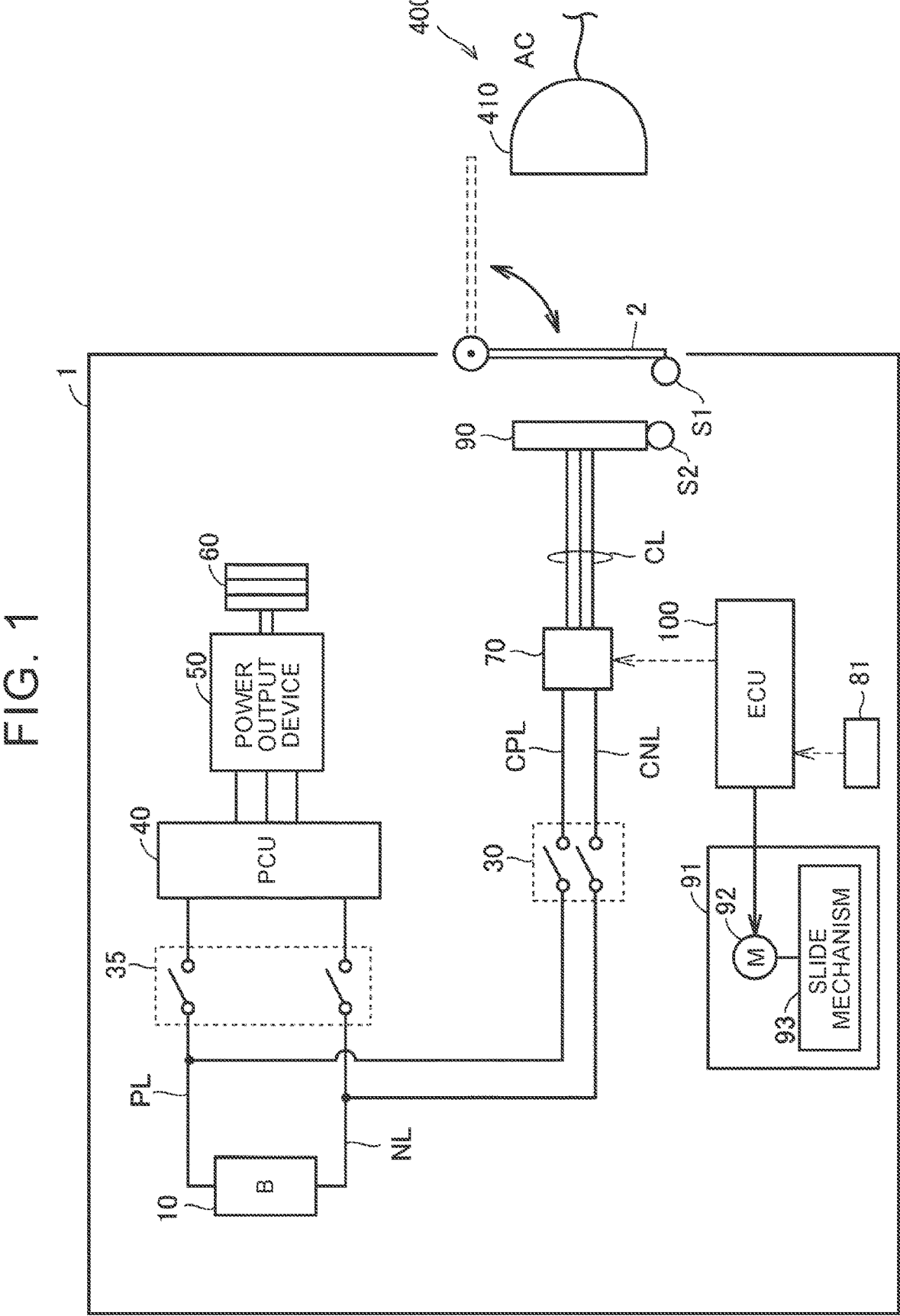
FIG. 1 is a diagram schematically illustrating an overall configuration of an electrified vehicle 1 according to a first embodiment.

FIG. 1 is a diagram schematically illustrating an overall configuration of an electrified vehicle 1 according to a first embodiment. The electrified vehicle 1 is a vehicle that can be externally charged by charging an in-vehicle electric power storage device using electric power supplied from a charging cable connected to an alternating current electric power supply outside of the vehicle. The electrified vehicle 1 is, for example, an electrified vehicle such as a battery electric vehicle, a plug-in hybrid electric vehicle, a fuel cell electric vehicle, or the like. In the present embodiment, an example in which electrified vehicle 1 is a battery electric vehicle will be described. Note that while an example will be described in the present embodiment in which electric power is supplied from an alternating current electric power supply outside of the vehicle, during external charging of the electrified vehicle 1, the external electric power supply is not limited to an alternating current electric power supply. The external electric power supply may be a direct current electric power supply.

The electrified vehicle 1 includes an electric power storage device 10, a system main relay 35, a power control unit (hereinafter also referred to as "PCU") 40, a power output device 50, driving wheels 60, and an electronic control unit (ECU) 100.

The electric power storage device 10 is made up of a plurality of batteries, the batteries being stacked. The batteries are each a secondary battery, such as a nickel-metal hydride battery or a lithium-ion battery, for example. Also, the batteries may each be a battery having a liquid electrolyte between an anode and a cathode, or may each be a battery having a solid electrolyte (all-solid-state battery).

The PCU 40 collectively represents electric power conversion devices for receiving electric power from electric power storage device 10 and driving the power output device 50. For example, the PCU 40 includes an inverter for driving a motor included in the power output device 50, a converter for boosting electric power output from the electric power storage device 10 and supplying the boosted electric power to the inverter, and so forth.

The power output device 50 collectively represents devices for driving the driving wheels 60. For example, the power output device 50 includes a motor that drives the driving wheels 60, and so forth. The power output device 50 also generates electric power when braking of the vehicle and the like is performed, by the motor that drives the driving wheels 60 operating in a regeneration mode, and outputs the generated electric power to the PCU 40. Hereinafter, the power output device 50 and the driving wheels 60 will also be collectively referred to as "drive unit".

The system main relay 35 has one end electrically connected to the PCU 40, and the other end electrically connected to the electric power storage device 10. The system main relay 35 is switched between on and off states, in accordance with control signals from the ECU 100. When the system main relay 35 is in an off state, electric power supply from the electric power storage device 10 to the drive unit is cut off, and when the system main relay 35 is in an on state, electric power can be supplied from the electric power storage device 10 to the drive unit.

The ECU 100 includes a central processing unit (CPU), memory, and an input/output buffer, all not shown in the drawings, receives input of signals from sensors and so forth, outputs control signals to various equipment, and controls the various equipment. Note that this control is not limited to a process performed using software, and can also be constructed and processed by way of dedicated hardware (electronic circuit).

The electrified vehicle 1 includes a charging relay 30, a charger 70, a vehicle inlet 90, electric power lines CPL and CNL, and an electric power line CL, as a configuration for external charging.

The vehicle inlet 90 is a charging port configured to be connectable to a charging connector 410 provided at a distal end of a charging cable 400 of an external electric power supply. The vehicle inlet 90 is covered by a charging lid 2, whenever the charging connector 410 of the charging cable 400 is not connected. When the electrified vehicle 1 is to be externally charged, the charging lid 2 is opened and the charging connector 410 of the charging cable 400 is connected to the vehicle inlet 90.

The charger 70 is connected to the vehicle inlet 90 via the electric power line CL, and also is connected to one end of charging relay 30 via the electric power lines CPL and CNL. The charger 70 operates under control signals from the ECU 100, converts alternating current electric power received from the charging connector 410 via the vehicle inlet 90, into electric power that can charge the electric power storage device 10, and supplies the electric power to the electric power storage device 10. Accordingly, the electric power storage device 10 is charged using the alternating current electric power supplied from the charging connector 410.

The other end of the charging relay 30 is electrically connected to the electric power storage device 10. The charging relay 30 is switched between on and off states, in accordance with control signals from the ECU 100. The charging relay 30 is switched to the on state when electric power storage device 10 is being externally charged.

A lid open-closed sensor S1 is configured to detect an open-closed state of the charging lid 2 (i.e., whether the charging lid 2 is in an open or closed state). A known sensor can be employed as the lid open-closed sensor S1. Examples of the lid open-closed sensor S1 include a limit switch, a proximity sensor, and a photoelectric sensor. Detection results by the lid open-closed sensor S1 are output to the ECU 100.

A connector connection sensor S2 is configured to detect whether the charging connector 410 is connected to the vehicle inlet 90 of the electrified vehicle 1. A known sensor can be employed as the connector connection sensor S2. Examples of the connector connection sensor S2 include a limit switch, a proximity sensor, and a photoelectric sensor. Detection results by the connector connection sensor S2 are output to the ECU 100.

A sliding door 81 is configured to open and close an opening of the electrified vehicle 1. In the present embodiment, the sliding door 81 is an electric sliding door (power sliding door). The sliding door 81 can be electrically opened and closed.

The electrified vehicle 1 includes a sliding door drive control unit 91 for performing driving control of the sliding door 81. The sliding door drive control unit 91 includes a door motor (door drive unit) 92 and a slide mechanism 93.

The door motor 92 drives the sliding door 81. The slide mechanism 93 slides the sliding door 81 in a front-rear direction of the vehicle by driving force of the door motor 92.

FIG. 2 is a diagram illustrating the sliding door 81, the charging lid 2, and the vehicle inlet 90. When the sliding door 81 is moved to the position of the charging lid 2 and the vehicle inlet 90, and the charging lid 2 is open and the charging connector 410 of the charging cable 400 is connected to the vehicle inlet 90 at this time, the sliding door 81 may come into contact with the charging lid 2 and the charging cable 400.

In the present embodiment, the ECU 100 prohibits movement of the sliding door 81 when the charging connector 410 is connected to the vehicle inlet 90. More specifically, when the charging connector 410 is connected to the vehicle inlet 90, the ECU 100 does not cause the door motor 92 to drive the sliding door 81 even when an operation to open the sliding door 81 is performed, and maintains the sliding door 81 in a fully-closed state.

FIG. 3 is a flowchart showing a control procedure for the sliding door 81 according to the first embodiment.

In S101, an operation to open the sliding door 81 is performed. In S102, when the lid open-closed sensor S1 detects that the charging lid 2 is in a closed state, the process advances to S103. When the lid open-closed sensor S1 detects that the charging lid 2 is in an open state, the process advances to S105.

In S103, when the connector connection sensor S2 detects that the charging connector 410 is not connected to the vehicle inlet 90 of the electrified vehicle 1, the process advances to S104. When the connector connection sensor S2 detects that the charging connector 410 is connected to the vehicle inlet 90 of the electrified vehicle 1, the process advances to S105.

In S104, the ECU 100 causes the door motor 92 to drive the sliding door 81 so that the sliding door 81 is fully opened.

In S105, the ECU 100 does not cause the door motor 92 to drive the sliding door 81, but maintains the sliding door 81 in the fully-closed state.

Second Embodiment

Figure 4:
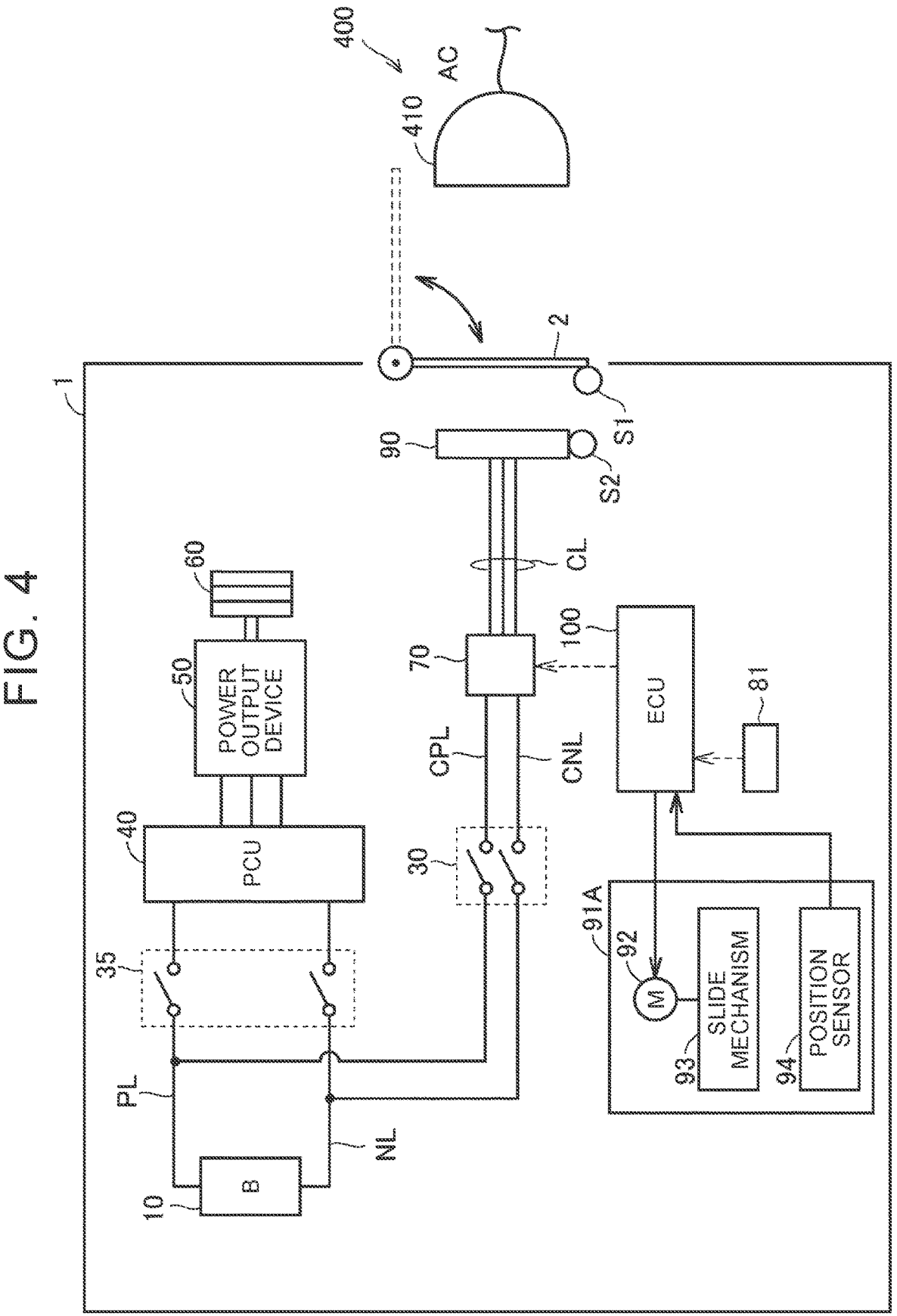
FIG. 4 is a diagram schematically illustrating an overall configuration of the electrified vehicle 1 according to a second embodiment.

FIG. 4 is a diagram schematically illustrating an overall configuration of the electrified vehicle 1 according to a second embodiment.

The electrified vehicle 1 includes a sliding door drive control unit 91A for performing driving control of the sliding door 81. The sliding door drive control unit 91A includes the door motor (door drive unit) 92 and the slide mechanism 93, in the same way as with the sliding door drive control unit 91 according to the first embodiment. The sliding door drive control unit 91A further includes a position sensor 94.

The position sensor 94 detects a position of the sliding door 81. For example, the position sensor 94 detects the position of the sliding door 81 by counting the number of revolutions of the door motor 92.

In the present embodiment, the ECU 100 restricts the range over which the sliding door 81 is movable by the door motor 92 when the charging connector 410 is connected to the vehicle inlet 90. More specifically, when an operation to open the sliding door 81 is performed, the ECU 100 controls the door motor 92 in accordance with output of the position sensor 94, so as to move the sliding door 81 to an intermediate position of the opening of the electrified vehicle 1.

Figure 5:
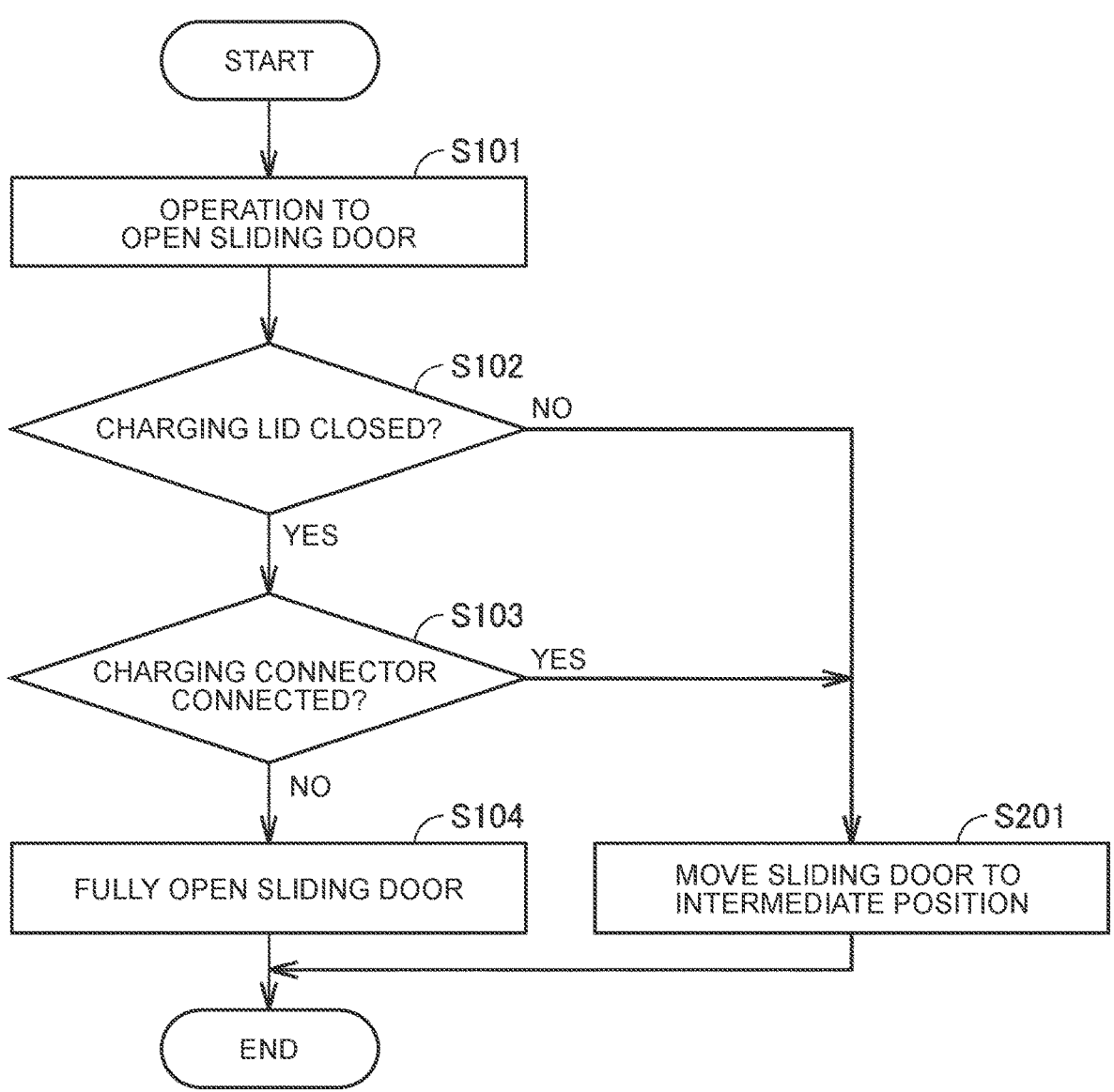
FIG. 5 is a flowchart showing control procedures for the sliding door 81 according to the second embodiment.

FIG. 5 is a flowchart showing a control procedure for the sliding door 81 according to the second embodiment.

In S101, an operation to open the sliding door 81 is performed.

In S102, when the lid open-closed sensor S1 detects that the charging lid 2 is in a closed state, the process advances to S103. When the lid open-closed sensor S1 detects that the charging lid 2 is in an open state, the process advances to S201.

In S103, when the connector connection sensor S2 detects that the charging connector 410 is not connected to the vehicle inlet 90 of the electrified vehicle 1, the process advances to S104. When the connector connection sensor S2 detects that the charging connector 410 is connected to the vehicle inlet 90 of the electrified vehicle 1, the process advances to S201.

In S104, the ECU 100 causes the door motor 92 to drive the sliding door 81 so that the sliding door 81 is fully opened.

In S201, the ECU 100 moves the sliding door 81 to an intermediate position of the opening of the electrified vehicle 1 by controlling the door motor 92 in accordance with the output of the position sensor 94.

Third Embodiment

In a third embodiment, the sliding door 81 is a manually-operated sliding door. The sliding door 81 can be manually opened and closed.

Figure 6:
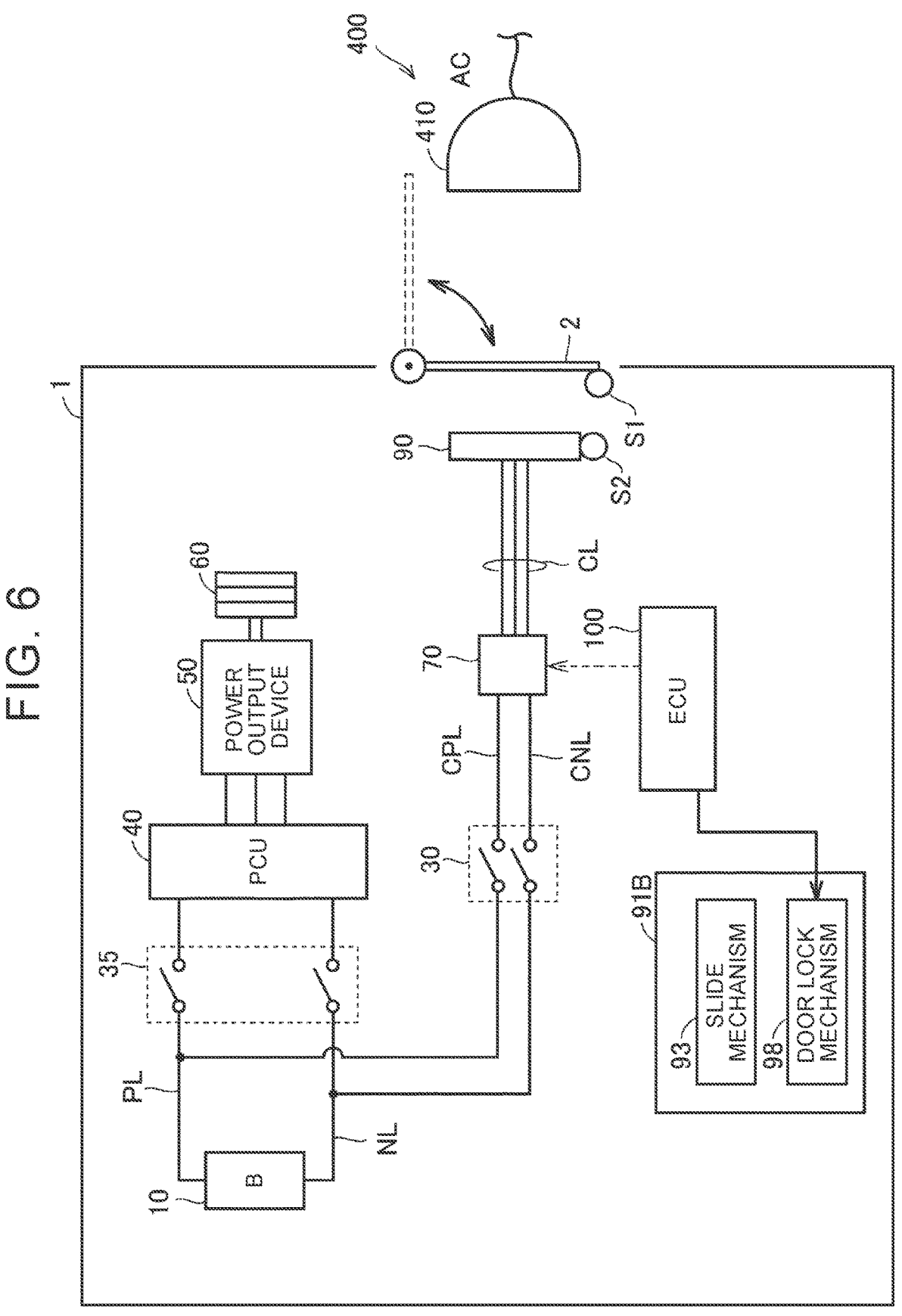
FIG. 6 is a diagram schematically illustrating an overall configuration of the electrified vehicle 1 according to a third embodiment.

FIG. 6 is a diagram schematically illustrating an overall configuration of the electrified vehicle 1 according to the third embodiment.

The electrified vehicle 1 includes a sliding door drive control unit 91B for performing driving control of the sliding door 81. The sliding door drive control unit 91B includes the slide mechanism 93, in the same way as with the sliding door drive control unit 91 according to the first embodiment. The sliding door drive control unit 91B further includes a door lock mechanism 98.

The door lock mechanism 98 includes a door lock actuator and a door lock link. The door lock actuator, which is made up of a gear and a motor, locks or unlocks the sliding door 81 by moving the door lock link up or down.

In the present embodiment, the ECU 100 prohibits movement of the sliding door 81 when the charging connector 410 is connected to the vehicle inlet 90. More specifically, ECU 100 causes the door lock mechanism 98 to lock the sliding door 81 when the charging connector 410 is connected to the vehicle inlet 90.

Figure 7:
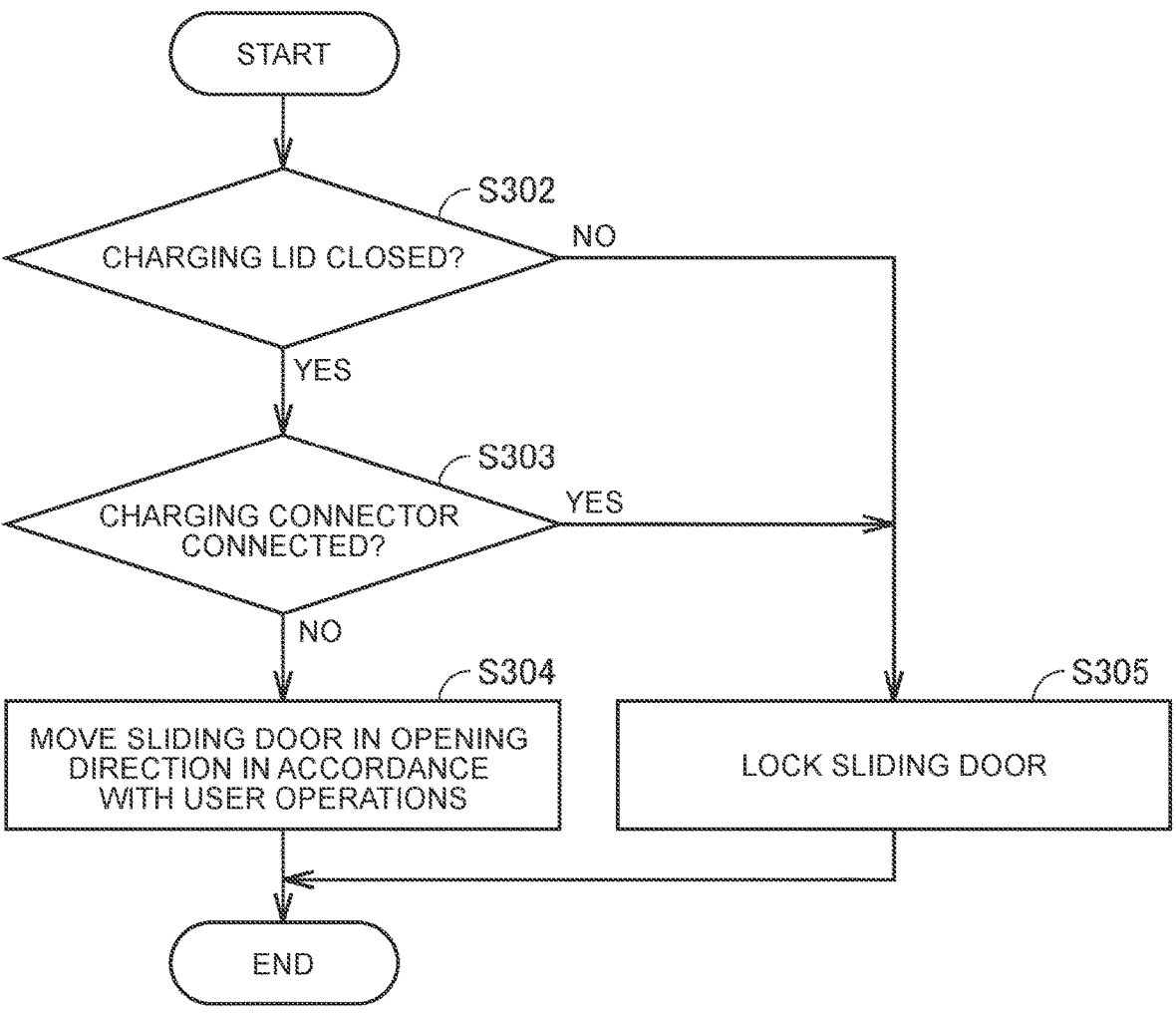
FIG. 7 is a flowchart showing control procedures for the sliding door 81 according to the third embodiment.

FIG. 7 is a flowchart showing a control procedure for the sliding door 81 according to the third embodiment.

In S302, when the lid open-closed sensor S1 detects that the charging lid 2 is in a closed state, the process advances to S303. When the lid open-closed sensor S1 detects that the charging lid 2 is in an open state, the process advances to S305.

In S303, when the connector connection sensor S2 detects that the charging connector 410 is not connected to the vehicle inlet 90 of the electrified vehicle 1, the process advances to S304. When the connector connection sensor S2 detects that the charging connector 410 is connected to the vehicle inlet 90 of the electrified vehicle 1, the process advances to S305.

In S304, the ECU 100 does not cause the door lock mechanism 98 to lock the sliding door 81. Thus, the sliding door 81 moves in an opening direction, in accordance with user operations.

In S305, the ECU 100 causes the door lock mechanism 98 to lock the sliding door 81. Accordingly, the sliding door 81 is locked and cannot move in the opening direction.

Fourth Embodiment

Figure 8:
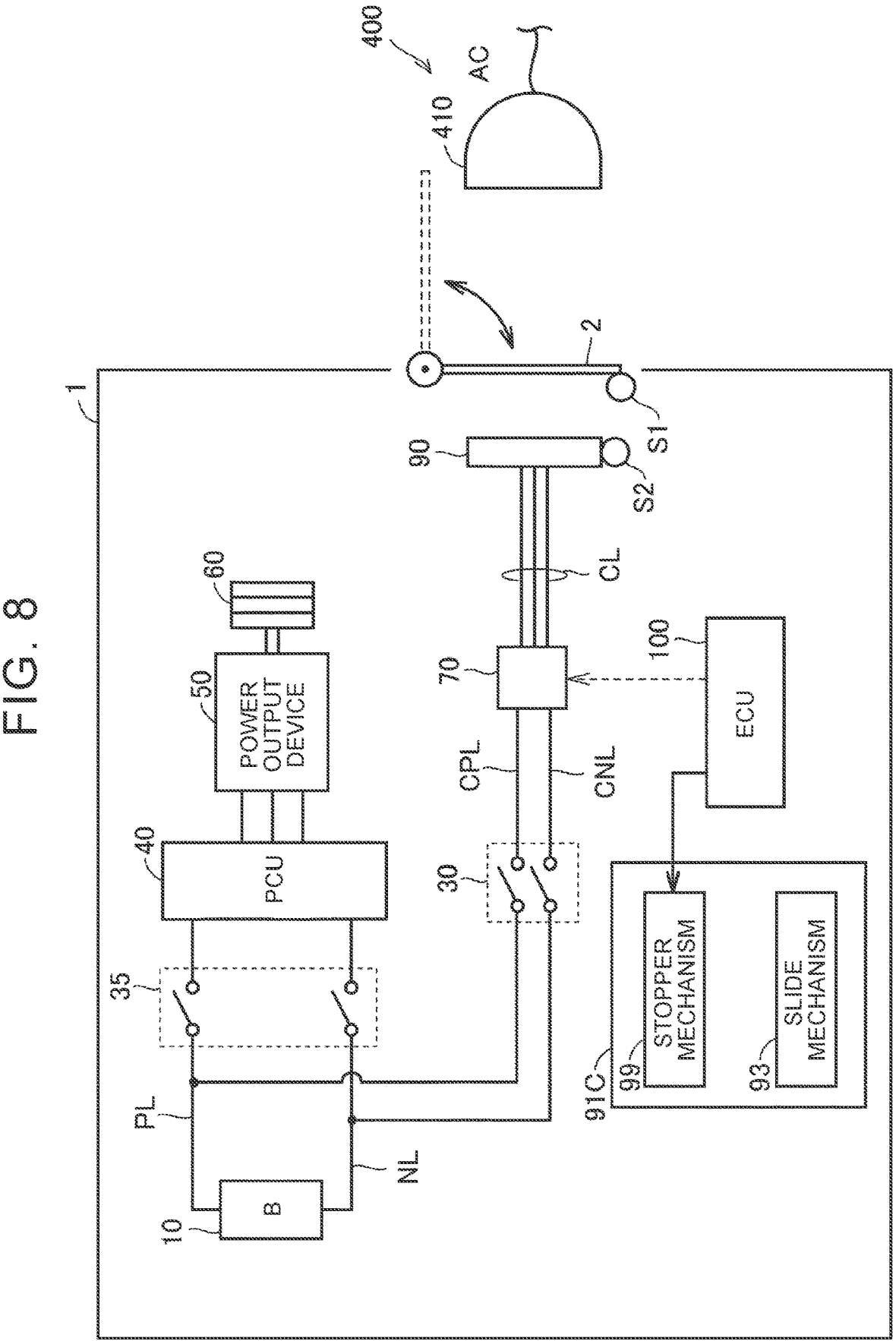
FIG. 8 is a diagram schematically illustrating an overall configuration of the electrified vehicle 1 according to a fourth embodiment.

FIG. 8 is a diagram schematically illustrating an overall configuration of the electrified vehicle 1 according to a fourth embodiment.

The electrified vehicle 1 includes a sliding door drive control unit 91C for performing driving control of the sliding door 81. The sliding door drive control unit 91C includes the slide mechanism 93, in the same way as with the sliding door drive control unit 91 according to the first embodiment. The sliding door drive control unit 91C further includes a stopper mechanism 99.

The stopper mechanism 99 includes a stopper lever that is provided on the sliding door 81 and that is configured to protrude to an intermediate position of the opening of the electrified vehicle 1 under control of the ECU 100, and an intermediate striker that is provided on the vehicle body and that protrudes at the intermediate position so as to engage the stopper lever.

In the present embodiment, the ECU 100 restricts the range over which the sliding door 81 is movable by the door motor 92 when the charging connector 410 is connected to the vehicle inlet 90. More specifically, when an operation to open the sliding door 81 is performed, the ECU 100 controls the stopper mechanism 99 to stop the sliding door 81 at the intermediate position of the opening of the electrified vehicle 1.

Figure 9:
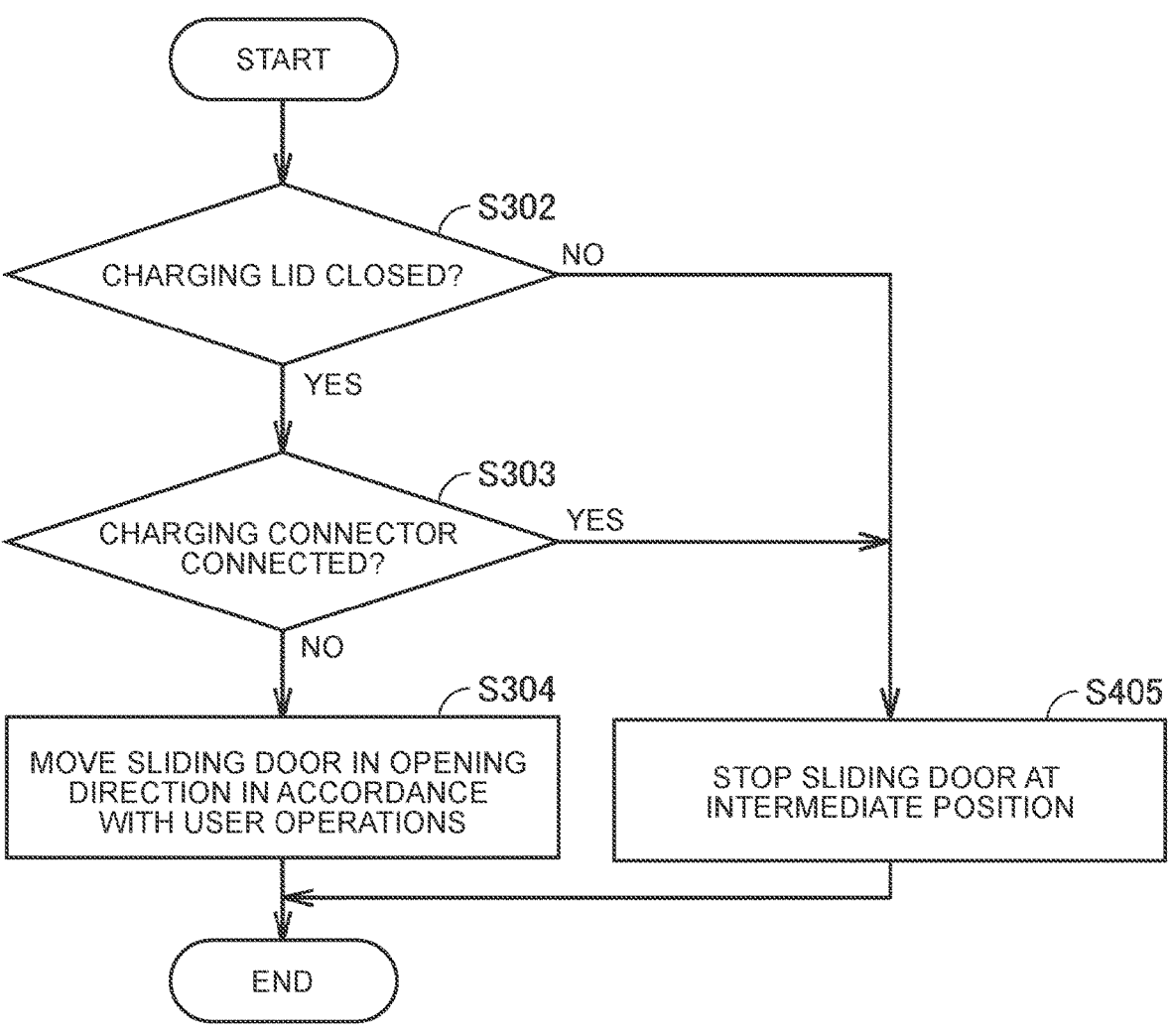
FIG. 9 is a flowchart showing control procedures for the sliding door 81 according to the fourth embodiment.

FIG. 9 is a flowchart showing a control procedure for the sliding door 81 according to the fourth embodiment.

In S302, when the lid open-closed sensor S1 detects that the charging lid 2 is in a closed state, the process advances to S303. When the lid open-closed sensor S1 detects that the charging lid 2 is in an open state, the process advances to S405.

In S303, when the connector connection sensor S2 detects that the charging connector 410 is not connected to the vehicle inlet 90 of the electrified vehicle 1, the process advances to S304. When the connector connection sensor S2 detects that the charging connector 410 is connected to the vehicle inlet 90 of the electrified vehicle 1, the process advances to S405.

In S304, the ECU 100 does not cause the stopper mechanism 99 to perform stopping control of the sliding door 81. Accordingly, the sliding door 81 moves in the opening direction in accordance with user operations, and the sliding door 81 can move to the fully-open position.

In S405, the ECU 100 causes the stopper mechanism 99 to perform stopping control of the sliding door 81. Thus, the sliding door 81 moves in the opening direction in accordance with user operations, but the sliding door 81 stops at the intermediate position of the opening of the electrified vehicle 1.

Modifications

Although description has been made in the above embodiments regarding an electrified vehicle in which electric power is used to generate the driving force for the vehicle and to which the charging connector of the charging cable is connected, the present disclosure is not limited to this. The contents of the above embodiments can also be applied to vehicles that generate driving force using other energy. The content of the above embodiments can also be applied to, for example, a vehicle that travels under power from an internal combustion engine and that is connected to a refueling gun or a hydrogen refueling gun, and to a fuel cell electric vehicle to which a hydrogen refueling gun is connected.

The charging port of the electrified vehicle, the charging connector of the charging cable connected to the charging port, and the electric power storage device for storing electric power, described in the embodiments, are examples of an energy supply port, an energy supply connector connected to an energy supply port, and an energy storage device (energy storage unit) for storing energy, respectively, of a general vehicle of which the energy is not limited to electric power.

The embodiments disclosed herein should be understood to be exemplary in all respects and not restrictive. The scope of the present disclosure is defined by the claims, rather than the above description, and is intended to include all modifications that fall within the meaning and scope of equivalence to the claims.

What is claimed is:

1. A vehicle, comprising:

a sliding door;

an energy storage device configured to store energy used to generate driving force for the vehicle;

an energy supply port located in a range of movement of the sliding door, the energy supply port being configured to receive the energy provided from an external energy supply source and supply the energy to the energy storage device; and a control device configured to restrict the movement of the sliding door to an intermediate position of opening when an energy supply connector is connected to the energy supply port.

2. The vehicle according to claim 1, wherein:

the external energy supply source is an external electric power supply;

the energy storage device is an electric power storage device;

the energy supply port is a charging port; and the energy supply connector is a charging connector of a charging cable.

3. The vehicle according to claim 1, further comprising a stopper mechanism controlled by the control device, the stopper mechanism including a stopper lever provided on the sliding door and configured to protrude to the intermediate position of the opening.

4. The vehicle according to claim 3, wherein the stopper mechanism includes an intermediate striker provided on a vehicle body and that protrudes at the intermediate position so as to engage the stopper lever.

5. The vehicle according to claim 1, wherein the control device locks the sliding door when the energy supply connector is connected to the energy supply port.

* * * * *